(12) United States Patent
Bernardon

(10) Patent No.: US 7,961,083 B2
(45) Date of Patent: Jun. 14, 2011

(54) DIGITAL SATELLITE RECEIVER CONTROLLER

(75) Inventor: Derek Bernardon, Villach (AT)

(73) Assignee: Infineon Technologies AG, Neubiberg (DE)

( * ) Notice: Subject to any disclaimer, the term of this patent is extended or adjusted under 35 U.S.C. 154(b) by 958 days.

(21) Appl. No.: 11/846,856

(22) Filed: Aug. 29, 2007

(65) Prior Publication Data
US 2009/0058620 A1 Mar. 5, 2009

(51) Int. Cl.
*B60R 25/10* (2006.01)
(52) U.S. Cl. ............... 340/428; 340/870.15; 375/316
(58) Field of Classification Search .............. 340/870.15, 340/3.1, 310.11, 428; 375/340, 316, 356
See application file for complete search history.

(56) References Cited

U.S. PATENT DOCUMENTS

| | | | | |
|---|---|---|---|---|
| 2,598,929 A * | 6/1952 | Moore | ............ | 348/698 |
| 3,461,239 A * | 8/1969 | Widl | ............ | 375/355 |
| 3,544,996 A * | 12/1970 | Pile | ............ | 342/174 |
| 3,568,179 A * | 3/1971 | Lampkin, Jr. | ............ | 341/164 |
| 3,786,501 A * | 1/1974 | Marnerakis | ............ | 340/509 |
| 4,167,700 A * | 9/1979 | Coe et al. | ............ | 380/33 |
| 4,733,167 A * | 3/1988 | Tamamura | ............ | 341/120 |
| 4,933,906 A * | 6/1990 | Terada et al. | ............ | 365/185.21 |
| 5,109,213 A * | 4/1992 | Williams | ............ | 340/447 |
| 5,229,712 A * | 7/1993 | Thornton | ............ | 323/322 |
| 5,243,270 A * | 9/1993 | Mayumi et al. | ............ | 322/28 |
| 5,581,172 A * | 12/1996 | Iwatani et al. | ............ | 322/28 |
| 5,598,110 A * | 1/1997 | Chang | ............ | 326/60 |
| 6,163,721 A * | 12/2000 | Thompson | ............ | 607/2 |
| 6,642,884 B2 * | 11/2003 | Bryant et al. | ............ | 342/357.64 |
| 6,700,889 B1 * | 3/2004 | Nun | ............ | 370/392 |
| 6,825,644 B2 * | 11/2004 | Kernahan et al. | ............ | 323/283 |
| 2002/0130696 A1 * | 9/2002 | Yoshizawa | ............ | 327/307 |
| 2002/0181438 A1 * | 12/2002 | McGibney | ............ | 370/350 |
| 2004/0017306 A1 * | 1/2004 | Miao | ............ | 341/155 |
| 2004/0080441 A1 * | 4/2004 | Plymale et al. | ............ | 341/144 |
| 2004/0177102 A1 * | 9/2004 | Nakamura et al. | ............ | 708/200 |
| 2004/0178851 A1 * | 9/2004 | Ishida et al. | ............ | 330/279 |
| 2005/0195991 A1 * | 9/2005 | Wang et al. | ............ | 381/94.5 |
| 2005/0219097 A1 * | 10/2005 | Atriss et al. | ............ | 341/144 |
| 2005/0246433 A1 * | 11/2005 | Carrigan et al. | ............ | 709/223 |
| 2006/0164050 A1 * | 7/2006 | Hasegawa et al. | ............ | 323/272 |
| 2006/0176200 A1 * | 8/2006 | Lin et al. | ............ | 341/144 |
| 2006/0249312 A1 * | 11/2006 | Alvarez et al. | ............ | 180/2.1 |
| 2007/0052472 A1 * | 3/2007 | Lin et al. | ............ | 327/538 |

FOREIGN PATENT DOCUMENTS

| | | |
|---|---|---|
| DE | 10333993 A1 | 2/2005 |
| DE | 10333993 A1 | 2/2005 |

OTHER PUBLICATIONS

German Office Action dated Nov. 21, 2008 re DE10333993A1.

* cited by examiner

*Primary Examiner* — George A Bugg
*Assistant Examiner* — Paul Obiniyi
(74) *Attorney, Agent, or Firm* — Lee & Hayes, PLLC

(57) ABSTRACT

This disclosure relates to a satellite receiver controller having a digital to analog circuit with an output having a dynamic range offset voltage, which is adjusted in synchronization with a signal pulse.

6 Claims, 8 Drawing Sheets

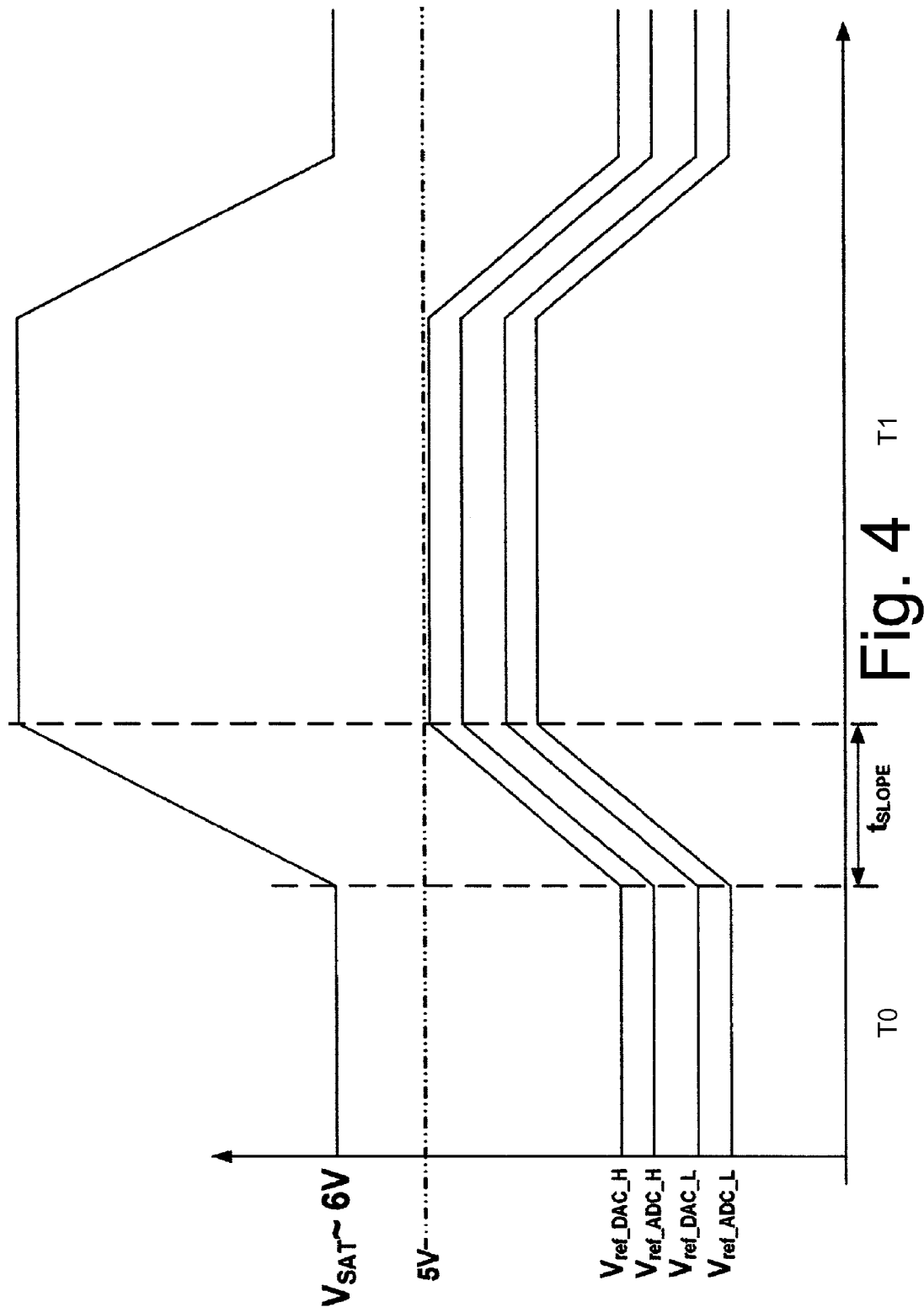

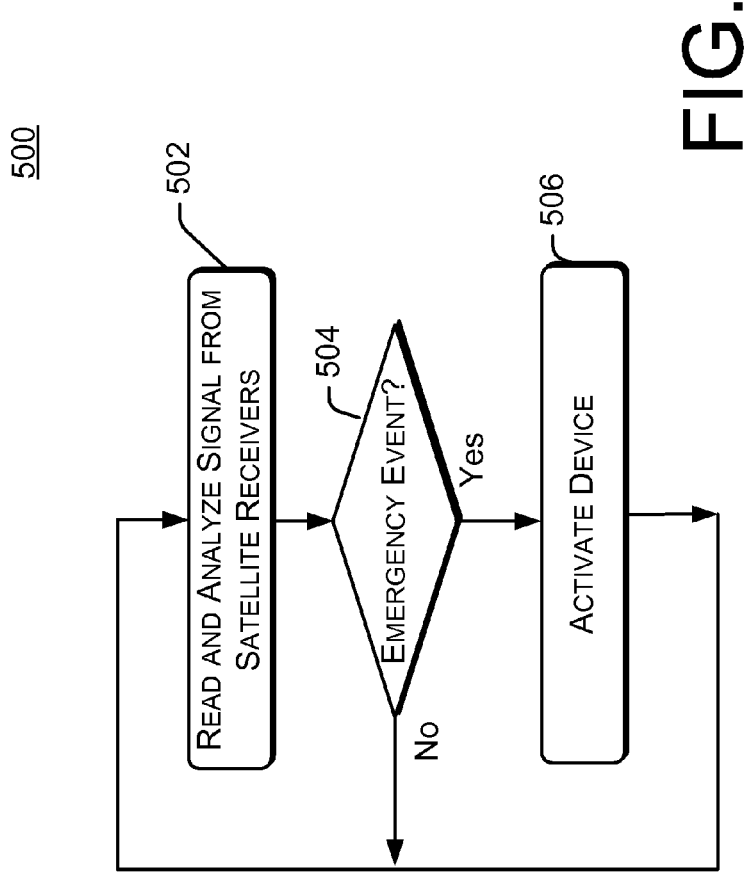

DIGITAL SATELLITE RECEIVER CONTROLLER

BACKGROUND

This application relates to controlling vehicle satellite receivers, and more specifically to using a digital controller to regulate voltage levels provided to a vehicle satellite receiver that periodically requires a synchronization pulse.

Automobiles have control systems that use sensors to monitor vehicle acceleration, vehicle deceleration and change in pressure at various locations on the surface of a vehicle. These sensors are connected to satellite receivers, which generate an electrical signal to indicate information about the sensor to an emergency control unit (ECU) associated with a vehicle. For example, a vehicle may have sensors that detect rapid changes in the vehicle velocity and provide digital current signals to the ECU to deploy an emergency device, such as an automotive airbag, to a passenger in the vehicle.

Each satellite receiver generates signal characteristics corresponding to the application of the sensor. Thus these satellite receivers each communicate signals to a separate ECU having unique voltage levels and current. For the ECU to communicate with the satellite receiver, the voltage levels from the receiver are uniquely regulated with an analog voltage controller. The controllers are designed by first evaluating each possible application of the sensor, and then by tailoring the design of each controller to suit all the sensors environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a timing diagram of a synchronization pulse generated by the bias voltage generation circuit with reference voltages that regulate the signal line converter circuit and the digital to analog converter circuit.

FIG. 5a is a flow diagram of a method for activating devices based on digital current signals received from the satellite receivers, and FIG. 5b is a flow diagram of a method for regulating satellite receivers' voltages.

DETAILED DESCRIPTION

Figure 1A:
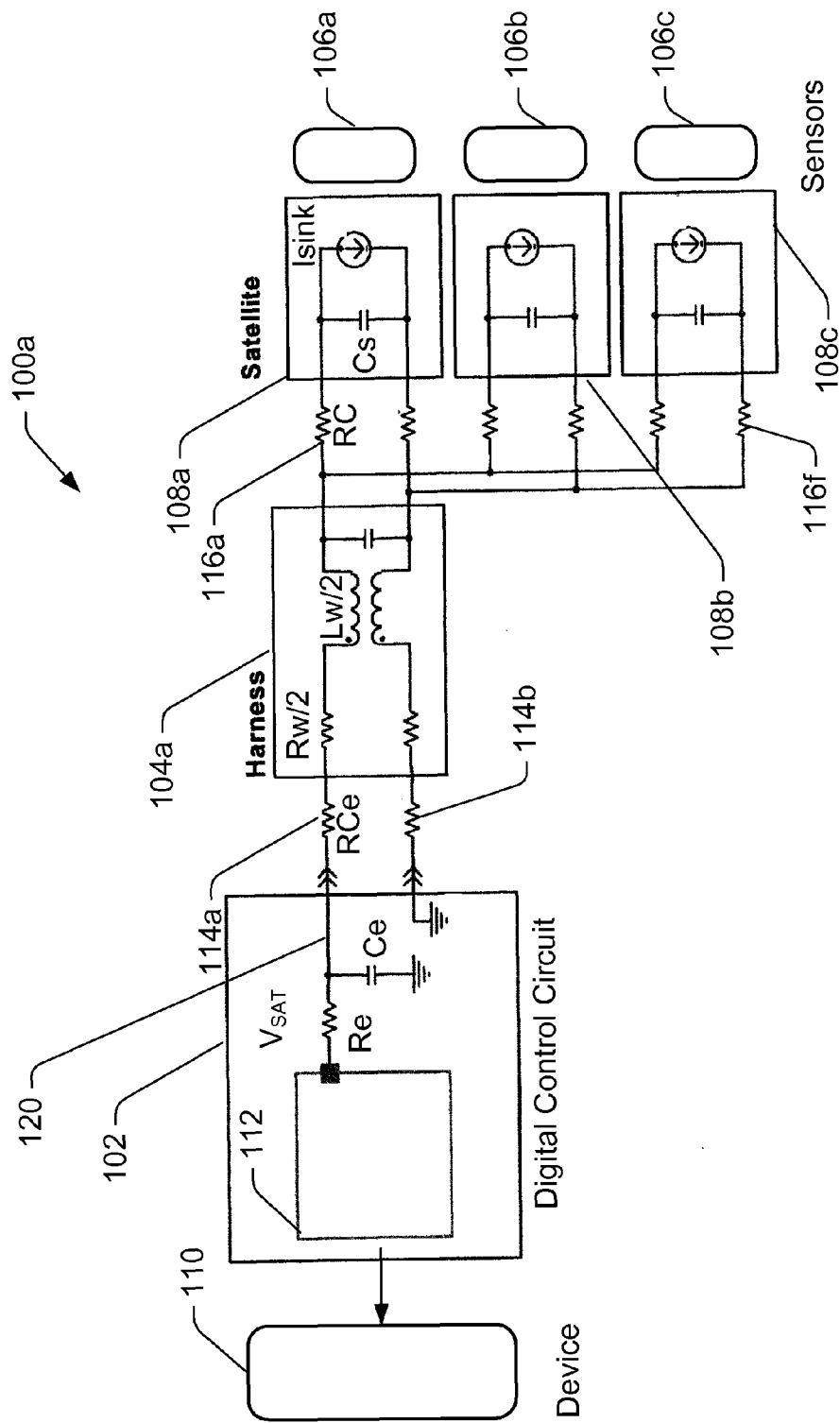
FIG. 1a is a system diagram of a digital satellite receiver control circuit connected in series to a plurality of parallel connected satellite receivers via a wire harness.

Disclosed herein are techniques for regulating, with a firmware enabled digital satellite receiver controller, power supplied via a signal line to one or more vehicle satellite receivers. The digital satellite receiver controller also monitors signals transmitted by the satellite receivers to deploy an alarm or emergency device in the vehicle (e.g. an air bag). Using the receiver controller with firmware enables controller updating to suit all sensor environments. The receiver controller uses a digital to analog converter circuit to regulate the voltage level of the supplied power and uses a signal line converter circuit to monitor the supplied power and digital current signals from the satellite receivers.

The vehicle satellite receivers require that the controller periodically transmit a synchronization (sync) pulse. The voltage bias levels of the dynamic voltage range of the digital to analog converter circuit and the signal line converter circuit are adjusted to be in synchronization with the rise and fall of the voltage levels of the sync pulse. Adjusting the voltage bias levels enables the signal line and digital to analog converter circuit to monitor signals and regulate voltage levels on the signal line without increasing the dynamic range or resolution of the digital to analog converter circuit and the signal line converter circuit.

In one described implementation, voltage regulated power is supplied to one or more satellite receiver circuits via the signal line while simultaneously monitoring the signal line for a signal generated by the satellite receiver circuits. The power is supplied to a semiconductor device in the satellite receiver and may also be used to drive other devices or circuits within the satellite receiver.

Disclosed herein are techniques for receiving, via a signal line with a signal line converter circuit, current signal indicating a status of and information about the satellite receivers. In response to receipt of the analog signal, a processor (also generally referred to as an ECU) in the digital control circuit is fed a digital signal corresponding to the indicated status. The processor supplies to a digital to analog converter circuit a digital voltage indication. In response to the indication, the digital to analog converter circuit supplies the indicated voltage level to the signal line. A synchronization circuit periodically generates an analog synchronization pulse on the signal line for transmission to the satellite receivers.

According to another implementation, a method is provided using a digital to analog converter circuit having a fixed resolution and a fixed dynamic range. In the method, a dynamic range offset voltage (or bias voltage) of the digital to analog converter circuit's output is changed in synchronization with a signal pulse. In a further implementation, a signal line converter circuit is coupled with the digital to analog converter circuit. The digital to analog converter circuit's dynamic range offset voltage is adjusted to be in synchronization with the signal pulse.

The techniques described herein may be implemented in a number of ways. One example environment and context is provided below with reference to the included figures and on going discussion.

Exemplary Systems

Figure 1B:
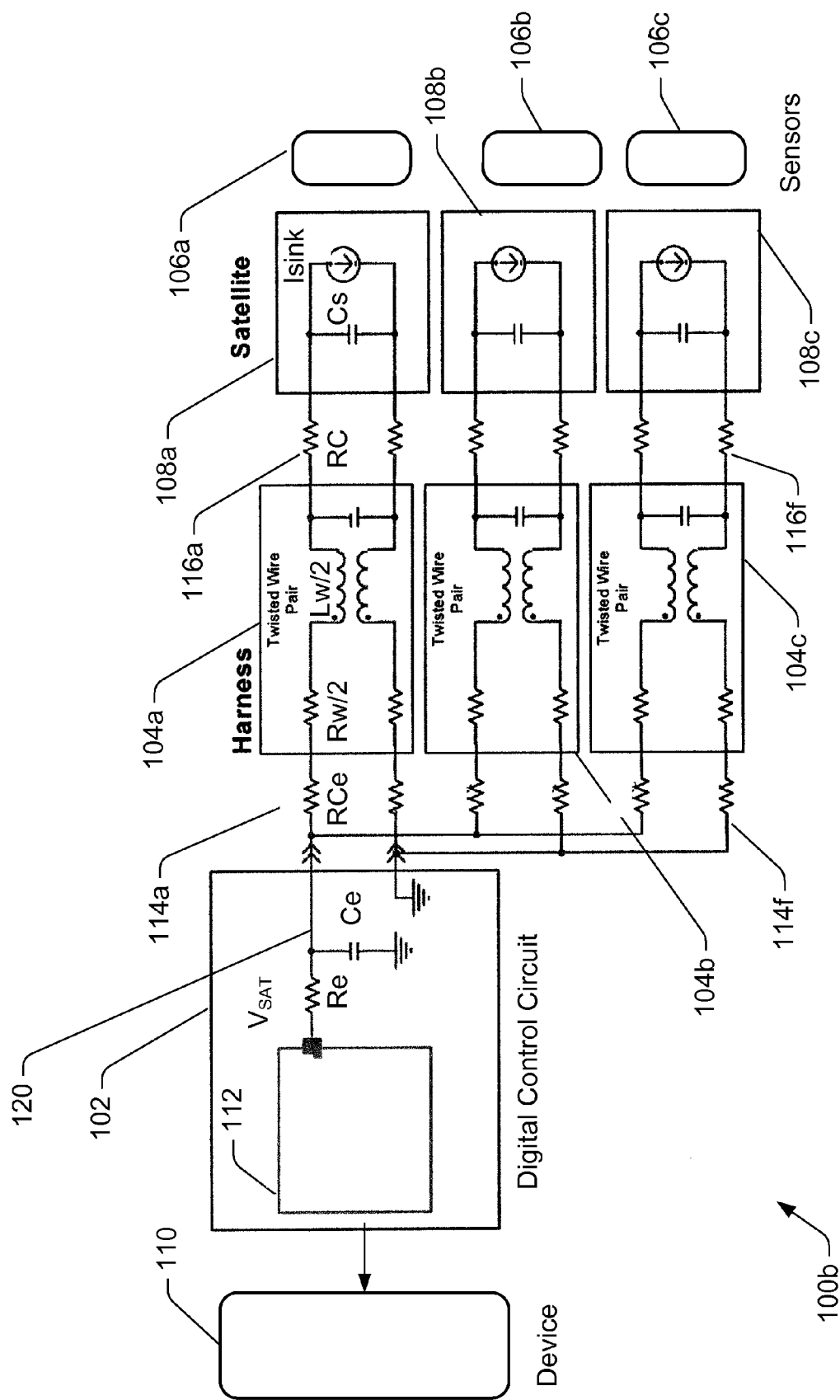
FIG. 1b is a system diagram of a digital satellite receiver control circuit connected in parallel with multiple wire harnesses that are each connected with a satellite receiver.

FIGS. 1a and 1b illustrate systems, 100a and 100b respectively, for regulating voltages supplied to satellite receivers and activating devices in response to status indications provided by sensors coupled with the receivers. In one implementation, illustrated in FIG. 1a, digital control circuit 102 is connected in series via a signal line with twisted pair wire harness 104a. The wire harness 104a is connected to sensors 106a-106c via multiple satellite receivers 108a-108c. A digital control circuit 102 is coupled through series resisters 114a and 114b to harness 104a, and harness 104a is connected with resisters 116a-116f to satellite receivers 108a-108c.

In another implementation, illustrated in FIG. 1b, digital control circuit 102 is coupled with parallel connected wire harnesses 104a-104c. Each of wire harnesses 104a-104c is respectively connected to sensors 106a-106c via satellite receivers 108a-108c.

Referring to FIG. 1b, digital control circuit 102 is coupled through series resisters 114a-114f to harnesses 104a-104c. Harnesses 104a-104c are connected via resisters 116a-116f to satellite receivers 108a-108c.

Illustrated in FIGS. 1a and 1b, digital control circuit 102 is connected to device 110. Digital control circuit 102 comprises a digital satellite receiver control circuit 112 having an output terminal coupled in series with resister $R_E$ and is shunt to ground with capacitor $C_E$. Digital control circuit 102 supplies power having a voltage level ($V_{SAT}$) via a signal line 120 and harness 104a (and harnesses 104b-104c in FIG. 1b) to satellite receivers 108a-108n. Digital control circuit 102 monitors signals transmitted from satellite receivers 108a-108n (such as the status of one or more sensors 106a-106c) and regulates voltage $V_{SAT}$ (such as a ripple voltage) on the signal line 120. Digital control circuit 102 analyzes the transmitted signal, and based on the analysis transmits a signal to activate device 110. In one implementation, device 110 is an emergency or an alarm device. Digital control circuit 102 periodically provides a synchronization pulse on the signal line 120 to satellite receivers 108a. Using a signal line converter circuit (not shown), digital control circuit 102 determines the voltage level on the signal line 120 without changing the dynamic range and resolution of the signal line converter circuit. Further details of the monitoring functionality of digital control circuit 102 are described in FIG. 2.

Harnesses 104a-104c, in one implementation, may be a twisted pair cables. Harnesses 104a-104c have an internal resistance (designated by resisters Rw/2), an internal inductance (designated by inductor Lw/2) and an internal capacitance (designated as Cw).

Satellite receivers 108a-c have an internal capacitance (designated by $C_S$) and a sink current (designated by $I_{SINK}$). Satellite receivers 108a-c are connected to and receive status indications from sensors 106a-106b. Such status indications may be provided as a result of increases or decreases in vehicle acceleration or changes in pressure on the vehicle as detected by one of sensors 106a-106c. Satellite receivers 108a-c are supplied the regulated voltage $V_{SAT}$ from digital control circuit 102 via signal line 120. The current $I_{SINK}$ changes in response to the indication from sensors 106a-106b, thereby providing a status indication of the sensors via harness 104a to digital control circuit 102.

Although three satellite receivers are shown connected to three sensors, this implementation is meant to serve only as a non-limiting example and a fewer number or greater number of sensors and harnesses may be used.

Exemplary Device

Figure 2:
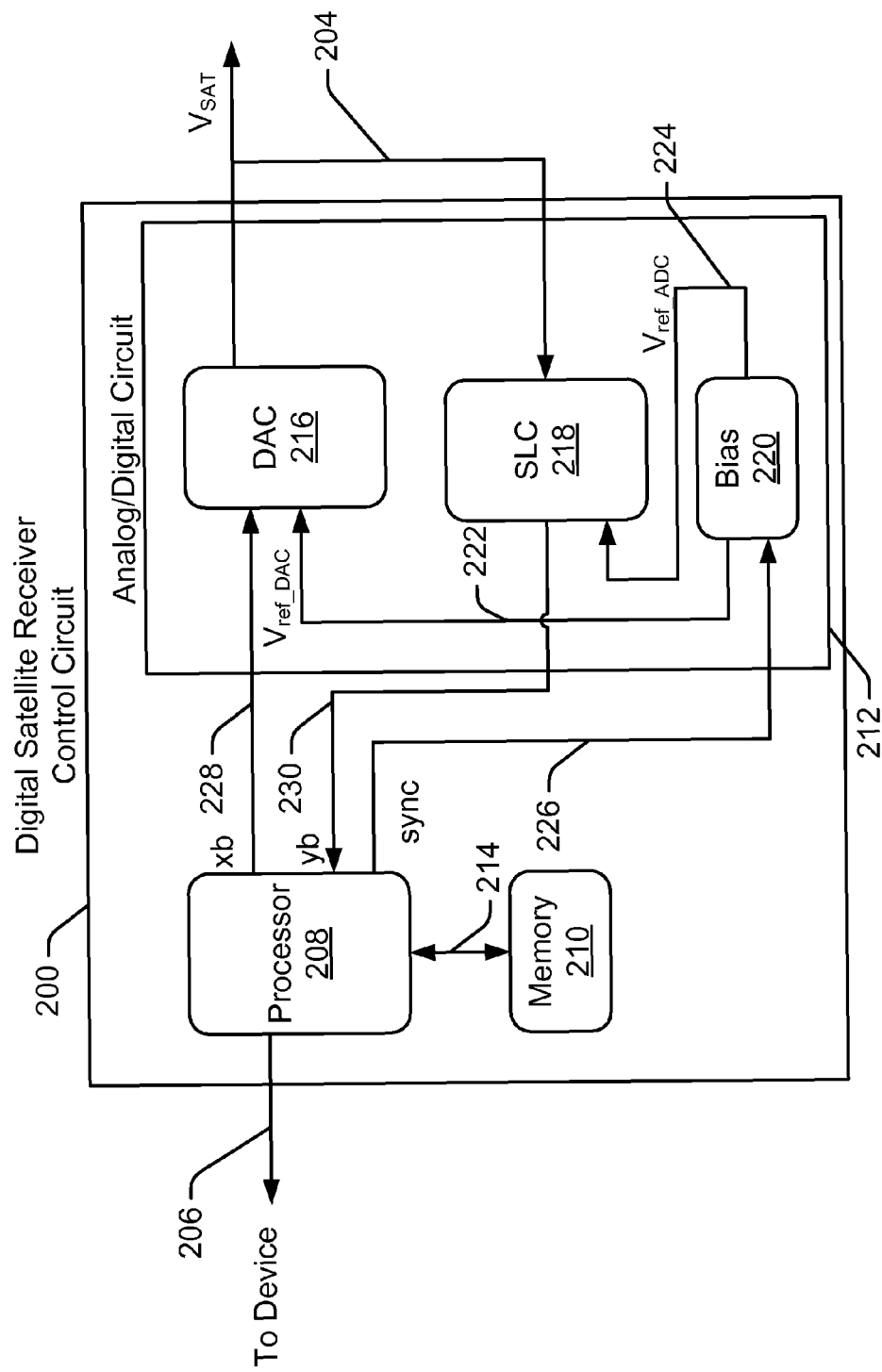
FIG. 2 is a simplified schematic diagram of the digital satellite receiver control circuit.

FIG. 2 shows one implementation of a digital satellite receiver control circuit 200, which is designated as circuit 112 in FIG. 1. Digital satellite receiver control circuit 200 supplies voltage $V_{SAT}$ on signal line 204 (signal line 120 of FIG. 1) and is coupled to device 110 (FIG. 1) via indication line 206. Digital satellite receiver control circuit 200 comprises a processor 208 coupled with memory 210 and analog/digital circuit 212. Processor 208 is coupled with memory 210 via system bus 214.

The processor 208 or ECU illustrated in FIG. 2 is a general processor which can monitor satellite receivers and send signals to other devices in a vehicle. The processor 208 is only one example of a processor and is not intended to suggest any limitation as to the scope of use or functionality of processor architectures. Neither should the processor 208 be interpreted as having any dependency or requirement relating to any one or combination of components illustrated in the exemplary processor 208 environment.

The processor 208 may be connected to, but is not limited to, one or more processors or processing units, a memory 210, and a system bus 214 that connects various system components (not shown) including the processor 208 and the memory 210.

The memory 210 can comprise a variety of computer readable media. Such media may be any available media that is accessible by the processor 208 and includes both volatile and non-volatile media, and removable and non-removable media. The process for monitoring and analyzing the satellite receivers can be stored as instructions sets (as software or firmware) on the computer readable media and such instructions may be updated.

The memory 210 may include the computer readable media in the form of non-volatile memory, such as a read only memory (ROM), and/or volatile memory, such as a random access memory (RAM). Memory 210 may also include other removable/non-removable, volatile/non-volatile computer storage media.

Analog/digital circuit 212 includes a digital to analog converter circuit 216, a signal line converter circuit 218 and a voltage bias circuit 220. Digital to analog converter circuit 216 supplies voltage $V_{SAT}$ to signal line 204. In one implementation, signal line converter circuit 218 and digital to analog converter circuit 216 have a pre-set fixed dynamic voltage range and fixed resolution. Digital to analog converter circuit 216 is supplied a digital voltage level indication signal xb on lines xb 228 from processor 208, and correspondingly supplies the indicated level of the voltage $V_{SAT}$ on signal line 204. Signal line converter circuit 218 provides a digital signal indication on lines yb 230 indicating a relative voltage $V_{SAT}$ on signal line 204 and digital current signals from the satellite receivers, e.g. 108a-108c. Processor 208 analyzes the indication on lines yb 230 and provides a signal (such as a deploy indication) to device 110 via line 206 or transmits an indication on lines xb 228 to digital to analog converter circuit 216 to adjust the output voltage $V_{SAT}$ on signal line 204. By adjusting the output voltage $V_{SAT}$ on signal line 204, the ripple voltage on signal line 204 can be regulated. Details of the operation of the processor 208 are described in FIG. 5.

Voltage bias circuit 220 supplies reference voltages ($V_{ref\_DAC}$) via lines 222 to digital to analog converter circuit 216 and reference voltages ($V_{ref\_ADC}$) via lines 224 to signal line converter circuit 218. Voltage bias circuit 220 is periodically provided sync indication from processor 208 via line 226. In response to the sync indication, voltage bias circuit 220 internally generates a synchronization pulse that results in an increase in the voltage levels (also referred to herein as the dynamic range offset voltage or the bias voltage) of $V_{ref\_DAC}$ and $V_{ref\_ADC}$. In response to these increases, the digital to analog converter circuit increases the voltage level $V_{SAT}$. Signal line converter circuit 218 monitors voltage $V_{SAT}$ for signals from the satellite receivers 108a-c. When the voltage bias circuit 220 increases voltages $V_{ref\_ADC}$, the bias voltage (or the dynamic range offset voltage) of signal line converter circuit 218 is adjusted to track the synchronization pulse. Specifically the bias voltage of the signal line converter circuit 218 increases and decreases with the synchronization pulse. More details of the operations of digital to analog converter circuit 216 and signal line converter circuit 218 are described in FIG. 3 and FIG. 4.

Figure 3A:
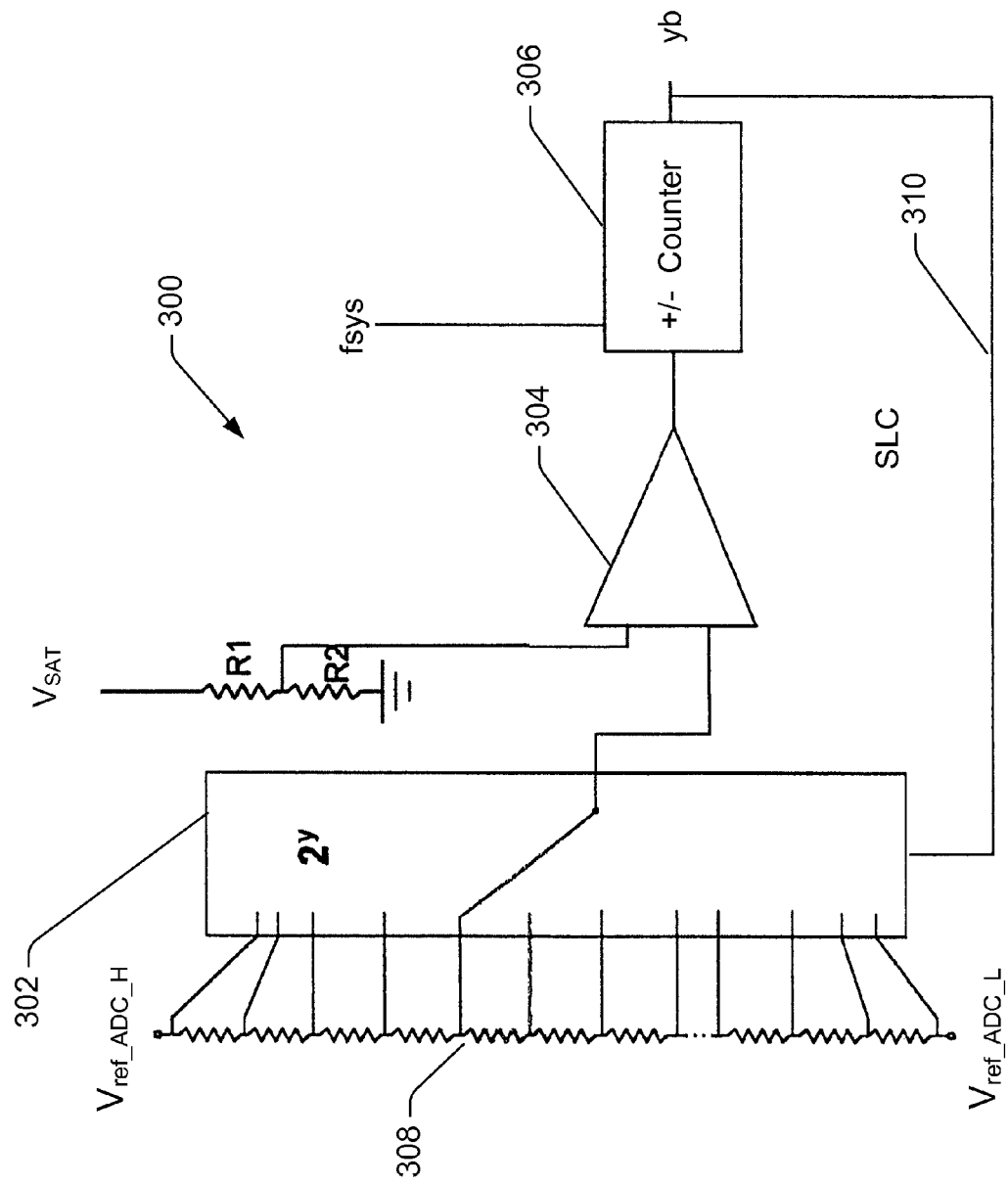
FIGS. 3a-3c are schematic diagrams of a signal line converter circuit, a digital to analog converter circuit and a bias voltage generation circuit respectively in the digital satellite receiver control circuit.

Illustrated in FIG. 3a is an exemplary signal line converter circuit 300 (designated as circuit 218 in FIG. 2) having an analog switch 302 connected via comparator 304 to digital counter 306. The analog input terminals of analog switch 302 are connected to terminals on series resistors 308, which are coupled between a high reference voltage $V_{REF\_ADC\_H}$ and a low reference voltage $V_{REF\_ADC\_L}$. Voltages $V_{ref\_ADC\_H}$ and $V_{ref\_ADC\_L}$ define the range of input voltages that the signal line converter circuit 300 can track voltages. High reference voltage $V_{REF\_ADC\_H}$ and low reference voltage $V_{REF\_ADC\_L}$. (designated as $V_{ref\_ADC}$ in FIG. 2) are supplied by voltage bias circuit 220 (FIG. 2). The voltage potential of voltages $V_{REF\_ADC\_H}$ and $V_{REF\_ADC\_L}$ is set by voltage bias circuit 220. Voltage $V_{SAT}$ on signal line 204 (FIG. 204) is shunt through series resistors R1 and R2 to ground to step down the level of voltage $V_{SAT}$. One terminal on comparator 304 is connected to the bias of the resistors R1 and R2 and the other terminal is connected to the output of switch 302.

Comparator 304 compares the voltage level of switch 302 output against the stepped down voltage $V_{SAT}$, and the result is fed to digital counter 306. Comparator 304 generates a high bit when the stepped down voltage $V_{SAT}$ is greater than the output voltage level of analog switch 302 and generates a low bit when the voltage $V_{SAT}$ is less than the voltage level output of analog switch 302.

A high speed clock feeds a clock signal (fsys) to digital counter 306 to clock the output of comparator 304. Digital counter 306 generates digital signal or bits on lines 310 (lines yb 230 in FIG. 2) that are fed back to analog switch 302 and processor 208. Thus as voltage $V_{SAT}$ increases or decreases, the number of high bits on the output of counter 306 correspondingly increases and decreases. Further, if the bias level of resistor network 308 is increased and decreased with changes to current on line 204 (from the satellite receivers) or the voltage $V_{SAT}$, such as when a synchronization pulse is provided, the signal line converter circuit 300 can track the levels of voltage $V_{SAT}$ without changing the dynamic range or resolution of the signal line converter circuit 300.

Figure 3B:
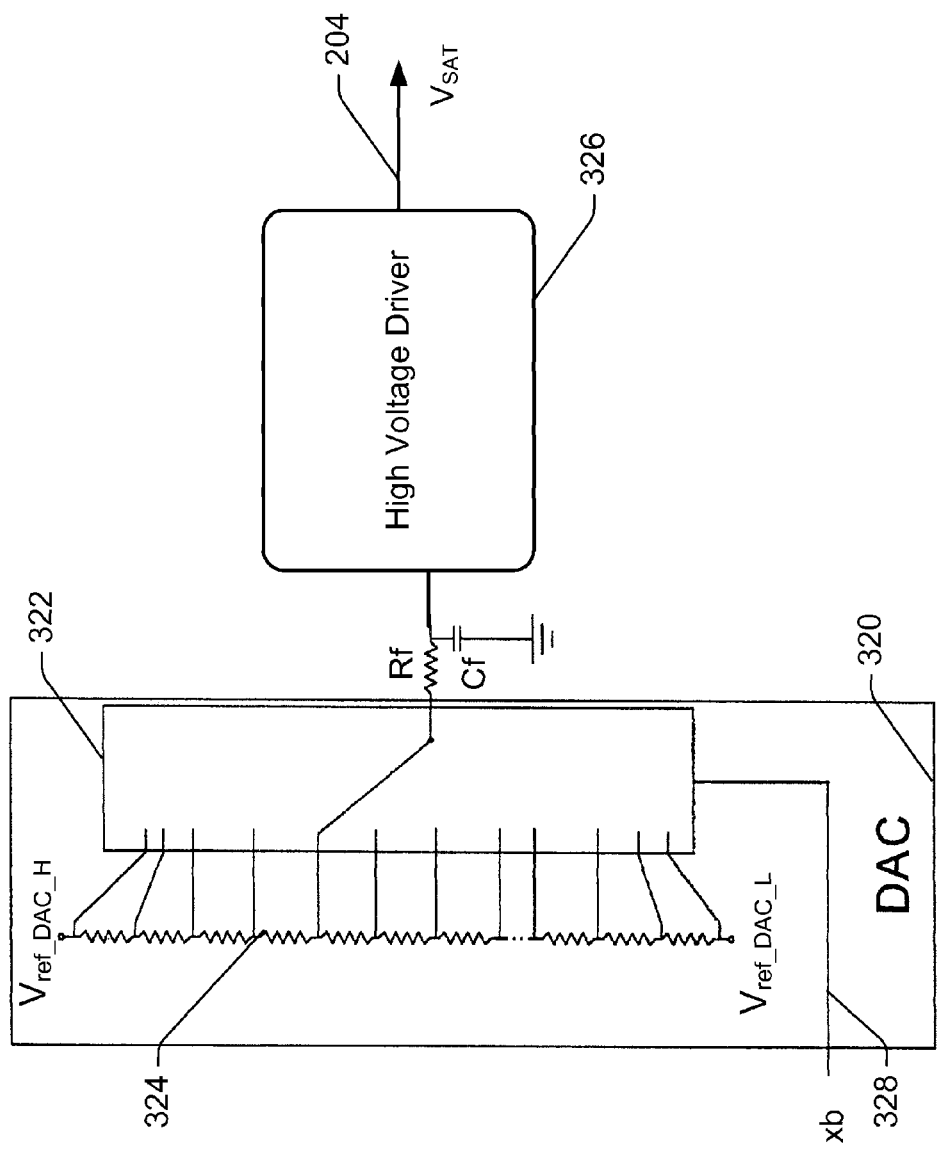

Illustrated in FIG. 3b is an exemplary digital to analog converter circuit 320 (designated as circuit 216 in FIG. 2) having an analog switch 322 coupled through resister Rf and shunt capacitor Cf to high voltage driver 326. High voltage driver 326 amplifies the voltage on the output of digital to analog converter circuit 320 to supply voltage $V_{SAT}$. The input terminals of analog switch are 322 are connected to series resisters 324, which are coupled in series between a high reference voltage $V_{REF\_DAC\_H}$ and a low reference voltage $V_{REF\_DAC\_L}$. Voltages $V_{ref\_DAC\_H}$ and $V_{ref\_DAC\_L}$ define the range of output voltages that the digital to analog converter circuit 320 can supply voltages. The reference voltages are supplied by voltage bias circuit 220 (FIG. 2). The voltage potential and offset of the voltage across $V_{REF\_DAC\_H}$ and $V_{REF\_DAC\_L}$ (designated as $V_{REF\_DAC}$ in FIG. 2) is set by voltage bias circuit 220. Digital to analog converter circuit 320 is connected to input lines xb 328 (lines 228 xb in FIG. 2) which are supplied bits from processor 208. Processor 208 set bits on lines xb 328 to indicate the voltage level to be set on the output of digital to analog converter circuit 320. The analog switch 322 selects the voltage level from its input terminals corresponding to the bits on line xb and feeds the selected voltage $V_{SAT}$ via high voltage driver 326 to signal line 204.

Figure 3C:
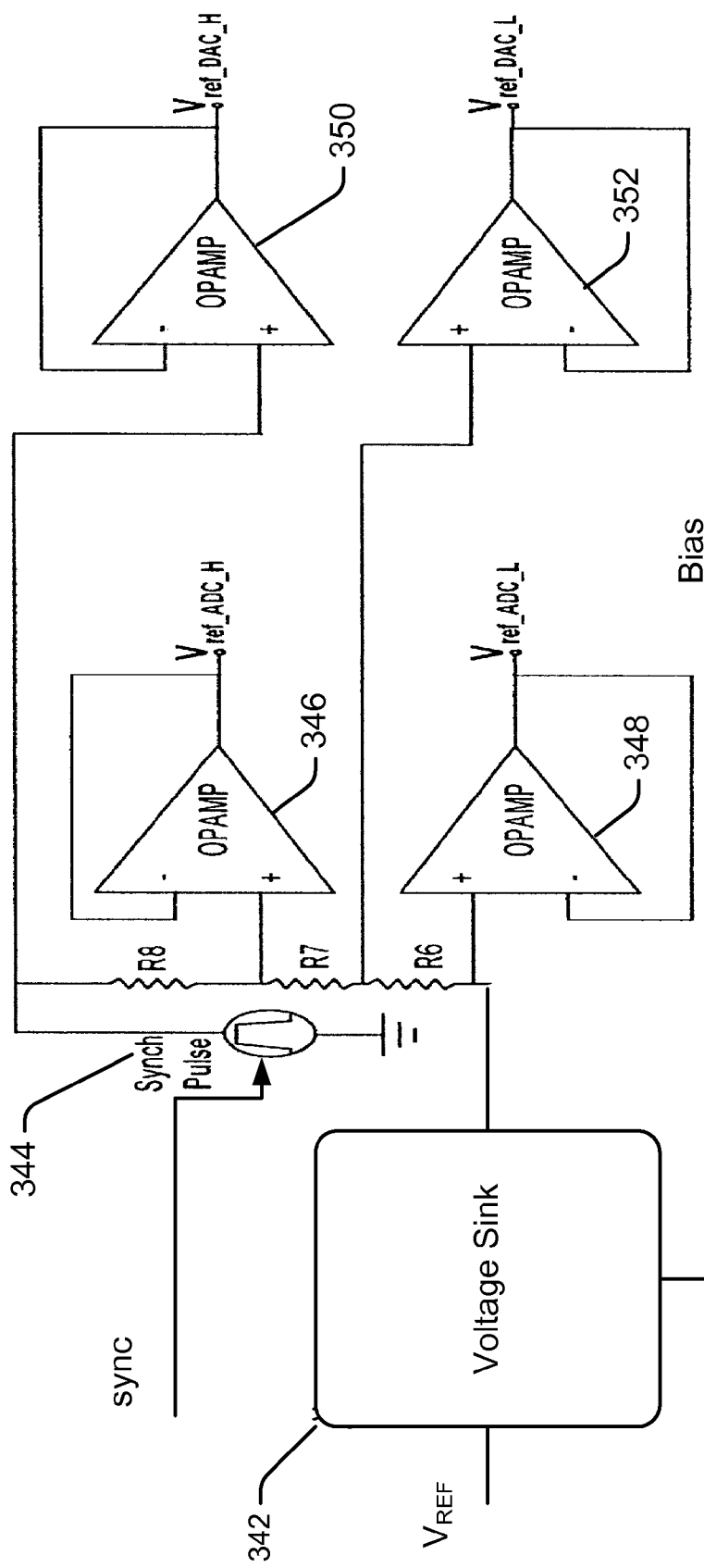

Illustrated in FIG. 3c is an exemplary voltage bias circuit 340 (designated as voltage bias circuit 220 in FIG. 2) that includes a voltage sink circuit 342 and sync pulse generator 344 coupled via resisters R6-R8 to positive input terminals of driver operational amplifiers 346-352. The outputs of operational amplifiers 346-352 are fed back to their negative input terminals so that operation amplifiers output voltage follows their input voltage.

Voltage sink circuit 342 is controlled by a voltage $V_{ref}$ that is generated using a standard resistor network, or that may be set using the processor 208 with a digital to analog converter circuit. Voltage sink circuit 342 sets the voltage on its output terminal as a function of the voltage $V_{ref}$. Amplifiers 348 and 352 likewise set the levels of voltages $V_{ref\_ADC\_L}$ and $V_{ref\_DAC\_L}$ to be at the level of the output of the voltage sink circuit 342.

Sync pulse generator 344 generates a synchronization pulse with a voltage level that rises and falls in response to a sync indication signal from processor 208 (line 226 in FIG. 2). In one implementation, the sync indication signal may be provided by a clock or a timer circuit rather than from the processor 208. When the synchronization pulse is generated by sync pulse generator 344, the voltage levels on the input to amplifiers 346 and 350 increase, and voltages $V_{ref\_ADC\_H}$ and $V_{ref\_DAC\_H}$ on the output of amplifiers 346 and 350 increase to track the synchronization pulse. Thus the dynamic range offset voltage or bias voltage ($V_{ref\_ADC\_H}$-$V_{ref\_ADC\_L}$) supplied to signal line converter circuit 300 and the dynamic range offset voltage or bias voltage ($V_{ref\_DAC\_H}$-$V_{ref\_DAC\_L}$) supplied to digital to analog converter circuit 320 are adjusted to track the synchronization pulse.

Illustrated in FIG. 4 are timing diagrams of the levels of voltages $V_{ref\_ADC\_H}$ and $V_{ref\_DAC\_H}$ on the output of amplifiers 346 and 350, the levels of voltages $V_{ref\_ADC\_L}$ and $V_{ref\_DAC\_L}$ on the output of amplifiers 348 and 352, and the voltage $V_{SAT}$. The voltage difference between $V_{ref\_ADC\_H}$ and $V_{ref\_ADC\_L}$ is the voltage potential across the signal line converter circuit (300 in FIG. 3a) input with respect to ground. The voltage difference between $V_{ref\_DAC\_H}$ and $V_{ref\_DAC\_L}$ is the voltage potential of the digital to analog converter circuit (circuit 320 in FIG. 3b) output with respect to ground.

Voltage levels $V_{ref\_ADC\_L}$, $V_{ref\_DAC\_L}$, $V_{ref\_ADC\_H}$ and $V_{ref\_DAC\_H}$, (also referred to as the bias voltages or dynamic range offset voltages of the signal line converter circuit 300 and the digital to analog converter circuit 320) and $V_{SAT}$ are at a nominal voltage level at time T0. In response to the synchronization pulse from the sync pulse generator 344, levels of voltage $V_{SAT}$ and the bias voltages increase during a time designated by $t_{slope}$. These voltage levels are at a peak voltage level during time T1 and then fall back to their nominal levels. Because $V_{ref\_ADC\_L}$, $V_{ref\_DAC\_L}$, $V_{ref\_ADC\_H}$ and $V_{ref\_DAC\_H}$ increase and decrease with the $V_{SAT}$, the signal line converter circuit 300 and the digital to analog converter circuit 320 can monitor the current on line 204 and the voltages on $V_{SAT}$ without increasing their resolution or dynamic range.

Exemplary Process

The exemplary processes, shown in FIGS. 5a and 5b, are illustrated as a collection of blocks in a logical flow diagram. The flow diagram is an exemplary process 500 used by processor 208 (see FIG. 2) in circuit 200, to monitor and regulate the satellite receivers, and represents a sequence of operations that can be implemented in hardware, software, firmware, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to circuit 200 of FIG. 2, although it may be implemented in other system architectures. The computer-readable media can be any available media that can be accessed by a computing device to implement the instructions stored thereon.

FIGS. 5a and 5b shows one example implementation of a process 500 for activating a device, monitoring voltage $V_{SAT}$ for signals from the satellite receiver and controlling the voltage $V_{SAT}$ on the signal line. In blocks 502-506, the digital current signals on line 204 are analyzed, and in blocks 508-520 the voltage level $V_{SAT}$ on line 204 is analyzed and regulated.

In block 502, digital current signals are read and analyzed from one or more of the satellite receivers 108(a-c) on line 204. These signals are provided from signal line converter circuit. A determination is made as to whether further action is indicated, such as when a rapid acceleration or increase in pressure in a vehicle is indicated. If further action is required ("Yes" to block 504), processor 208 may respond to the determination by providing an indication signal to activate a device 110, e.g. deploy an airbag. If no further action is required ("No" to block 504), the digital current signals are again read and analyzed in block 502.

Referring to FIG. 5b, the supply voltage $V_{SAT}$ is generated on the signal line 204 by processor 208 sending a voltage level indication via lines xb 228 to the digital to analog converter circuit 216 in block 508. In block 510, the sync pulse may be activated by processor 208 feeding a sync indication signal to sync pulse generator 344. The sync pulse may be activated at predetermined intervals and may be delayed for a predetermined interval. In block 512, the voltage $V_{SAT}$ on the signal line 204 is read using signal line converter circuit 218.

A determination is made in block 514 whether voltage $V_{SAT}$ on signal line 204 has changed. If it has changed ("Yes" to block 514), a determination is made in block 516 whether the voltage level of the signal line 204 has increased or decreased. If the level of the voltage $V_{SAT}$ on signal line 204 has increased, voltage $V_{SAT}$ is decreased in block 518 using digital to analog converter circuit 216. If the voltage $V_{SAT}$ has decreased, voltage $V_{SAT}$ is increased using digital to analog converter circuit 216 in block 520 to regulate the signal line 204 at a constant voltage and reduce the lines ripple voltage. If a determination is made that the voltage $V_{SAT}$ has not changed in block 514, or once voltage $V_{SAT}$ is changed in blocks 518 or 520, the process returns to reactivate the sync pulse in block 510.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. A system comprising:
a sensor to provide a signal corresponding to a status of an apparatus;
a satellite receiver to detect the signal from the sensor and to provide a signal indicating the status of the apparatus via a signal line;
a digital control circuit to receive the signal via the signal line and to supply power to the signal line, said digital control circuit to generate an indication signal to activate a device in response to receipt of the signal, the digital control circuit comprising:
a signal line converter circuit to determine the signal line voltage and to generate a signal corresponding to a voltage level when the voltage level of the signal line is within a first predetermined voltage range; and
a digital to analog converter circuit to set the voltage level of the power supplied to the signal line and to generate a voltage level within the second predetermined range, the first and second predetermined voltage ranges have maximum and minimum potentials with respect to ground;
a synchronization circuit to generate a periodic sync pulse on the signal line for transmission to the satellite receiver; and
a reference voltage generation circuit to simultaneously adjust the maximum and minimum potentials of the first and the second predetermined voltage ranges during the generation of the periodic sync pulse.

2. A system as recited in claim 1, wherein the apparatus is a vehicle.

3. A system as recited in claim 1, wherein the apparatus is a vehicle, and wherein the device is an alarm or emergency device that is activated in response to the indication signal.

4. A system as recited in claim 1, wherein the potentials of the first and the second predetermined voltage ranges are adjusted to simultaneously increase the potentials of the first and the second predetermined voltage ranges during generation of the periodic sync pulse and to simultaneously decrease the potentials of the first and the second predetermined voltage ranges when the periodic sync pulse is removed without changing a resolution of the signal line converter circuit and the digital to analog converter circuit.

5. A system as recited in claim 1, wherein the digital control circuit regulates a ripple voltage on the signal line during the periodic sync pulse generation.

6. A system as recited in claim 1, further comprising a plurality of the satellite receivers coupled with the satellite receiver that senses the status of additional apparatus sensors and provides additional signals to indicate the additional apparatus sensors status via the signal line.

* * * * *